(12) United States Patent
Meister

(10) Patent No.: US 7,673,832 B2
(45) Date of Patent: Mar. 9, 2010

(54) AIRCRAFT COMPONENT EXPOSED TO STREAMING SURROUNDING AIR

(75) Inventor: Juergen Meister, Neuenkirchen (DE)

(73) Assignee: Airbus Deutschland GmbH, Hamburg (DE)

( * ) Notice: Subject to any disclaimer, the term of this patent is extended or adjusted under 35 U.S.C. 154(b) by 393 days.

(21) Appl. No.: 11/568,916

(22) PCT Filed: May 11, 2005

(86) PCT No.: PCT/EP2005/005099

§ 371 (c)(1),
(2), (4) Date: Feb. 5, 2007

(87) PCT Pub. No.: WO2005/113336

PCT Pub. Date: Dec. 1, 2005

(65) Prior Publication Data

US 2007/0221788 A1    Sep. 27, 2007

Related U.S. Application Data

(60) Provisional application No. 60/606,601, filed on Sep. 2, 2004.

(30) Foreign Application Priority Data

May 13, 2004    (DE) ............... 10 2004 024 007

(51) Int. Cl.
*B64C 3/36*    (2006.01)
(52) U.S. Cl. ............... 244/123.1; 244/134 R
(58) Field of Classification Search ............... 244/207, 244/208, 209, 204, 134 R, 134 B, 134 C
See application file for complete search history.

(56) References Cited

U.S. PATENT DOCUMENTS 1,932,681 A * 10/1933 Smith ............... 244/134 B (Continued)

FOREIGN PATENT DOCUMENTS

DE    936618    12/1955

(Continued)

OTHER PUBLICATIONS

R.D. Wagner et al, Laminar Flow Control Leading-Edge Systems in Simulated Airline Service, Journal of Aircraft, vol. 27, No. 3, Mar. 1990, pp. 239-244, XP000136418, ISSN: 00218669.

(Continued)

*Primary Examiner*—Michael R Mansen
*Assistant Examiner*—Michael Kreiner
(74) *Attorney, Agent, or Firm*—Christopher Paradies; Fowler White Boggs P.A.

(57)    ABSTRACT

An aircraft component, such as a wing, has perforations through an outer wall for boundary layer suction. In the space between the outer wall and an inner wall partition walls form pressure channels and suction channels that are adjacent to each other and alternate, which channels communicate with the perforations. For example, alternating channels may be formed by a corrugated structure having trapezoidal corrugations providing a larger area for the suction channels than for the pressure channels. The pressure channels may be coupled to a hot-air reservoir by a control device, lines and valves, and the suction channels may be coupled to a vacuum reservoir, unless a short-circuit valve is used to cross connect the lines.

6 Claims, 1 Drawing Sheet

U.S. PATENT DOCUMENTS

| | | | | |
|---|---|---|---|---|
| 2,041,795 A | * | 5/1936 | Stalker | 244/208 |
| 2,071,744 A | * | 2/1937 | Anathor-Henrikson | 244/12.1 |
| 2,422,746 A | * | 6/1947 | Patterson | 244/134 C |
| 2,742,247 A | * | 4/1956 | Lachmann | 244/130 |
| 3,062,483 A | * | 11/1962 | Davidson | 244/207 |
| 3,085,740 A | * | 4/1963 | Wagner | 417/176 |
| 3,194,518 A | * | 7/1965 | Walsh | 244/130 |
| 3,213,527 A | | 10/1965 | Glaze | |
| 5,114,100 A | * | 5/1992 | Rudolph et al. | 244/134 C |
| 5,316,032 A | * | 5/1994 | DeCoux | 137/14 |
| 5,743,493 A | * | 4/1998 | McCaughan | 244/130 |
| 5,813,625 A | * | 9/1998 | Hassan et al. | 244/17.11 |
| 5,899,416 A | * | 5/1999 | Meister et al. | 244/207 |
| 5,944,287 A | | 8/1999 | Rodgers | |
| 6,302,360 B1 | * | 10/2001 | Ng | 244/203 |
| 2002/0134891 A1 | * | 9/2002 | Guillot et al. | 244/199 |

FOREIGN PATENT DOCUMENTS

| | | |
|---|---|---|
| DE | 1266136 | 4/1968 |
| DE | 19643069 A1 | 4/1998 |
| DE | 19643069 C2 | 3/1999 |
| DE | 69611656 T2 | 5/2001 |
| EP | 0630807 A1 | 12/1994 |
| EP | 0679572 A2 | 11/1995 |

OTHER PUBLICATIONS

D.V. Maddalon, Making Large Suction Panels for Laminar-Flow Control, NTIS Tech Notes, May 1991, Springfield, VA, US, p. 396, XP000336986, ISSN: 0889-8468.

* cited by examiner

AIRCRAFT COMPONENT EXPOSED TO STREAMING SURROUNDING AIR

FIELD OF THE INVENTION

The field relates to an aircraft component which is exposed to streaming surrounding air, such as a wing with perforations in the outer skin for boundary layer suction.

BACKGROUND OF THE INVENTION

Boundary layer suction from the surfaces of aircraft components that are exposed to streaming air is used to reduce the flow resistance and to increase the achievable lift by avoiding early change from a laminar flow to a turbulent flow. In unfavourable environmental conditions, there is a danger of the perforations in the outer skin, which perforations are used for boundary layer suction, icing up, or for an undesirable quantity of water entering the vacuum channel system that is connected to said perforations.

SUMMARY OF THE INVENTION

One advantage of an aircraft component, such as a wing, with perforations in the outer skin for boundary layer suction, having an outer wall, an inner wall and a space defined between the outer wall and the inner wall with suction channels and pressure channels arranged alternately between the inner wall and the outer wall by partition walls, is that icing up and blocking of the perforations may be avoidable, even when the surface area for outflow of warm pressurized air is less than the surface area for inflow of suction air.

According to one embodiment, this object may be met in that the above-mentioned aircraft component is designed with two walls and in the space between an inner and an outer wall element partition walls are inserted which with the incorporation of some sections of the wall elements adjoin each other so that alternately pressure channels and suction channels form, wherein first regions, serviced by the suction channels, of the outer wall element take up a significantly larger area than second regions, serviced by the pressure channels, and wherein by means of a control devices the pressure channels can be connected to a hot air reservoir, and the suction channels can be connected to a vacuum reservoir.

In one embodiment, the aircraft component designed meets the above object in that hot pressurised air, e.g. bleed air from an aircraft engine, is fed into the pressure channels and exits to the environment through the perforations in the second regions of the outer wall element. Because the second regions are considerably smaller in area than the first regions of the perforated outer wall element, which areas are connected to the suction channels, enough heat can be supplied in the outer wall element without interfering with the boundary layer suction.

In one embodiment, the aircraft component has partition walls formed by an integral sheet with trapezoidal corrugations, with the base areas of the sheet alternately resting against the outer wall element and against the inner wall element of the component and comprising openings which communicate with the perforations of the outer wall element. This design of the partition walls has advantages predominantly relating to production technology because a single component, namely the integral sheet with trapezoidal corrugations, forms a multiple number of pressure channels and suction channels, and provides the structure with adequate rigidity. Fixing the sheet with trapezoidal corrugations in the space between the inner and the outer wall element may take place by connection means known from the state of the art, such as riveting, soldering, and bonding etc.

In another embodiment, the aircraft component has an open side of the trapezoidal contour of the sheet with trapezoidal corrugations being longer by a multiple than the closed baseline. With such a design of the sheet with trapezoidal corrugations, a construction is achieved in a simple way in which the formed suction channels, which include the first regions of the outer wall elements, communicate with a significantly larger area of the perforations of the outer wall elements. In other words, direct suctioning off of the boundary layer by the suction channels may take place on a significantly larger part of the outer wall element.

According to a further embodiment, controllable valves are provided in the supply lines to the pressure channels or suction channels, by which controllable valves the negative pressure in the suction channels may be set by the control device. When substantial quantities of water arise on the outer skin, be it as a result of rain or as a result of the melting of ice, with this design the water may be prevented from being sucked into the suction pipe network as a result of excessive negative pressure in the suction channels, and icing over of the perforations may be prevented. It can be advantageous if the quantity of water arising at the outer skin is registered by suitable detectors, and if corresponding signals for controlling the negative pressure are transmitted to the control device.

BRIEF DESCRIPTION OF THE FIGURES

A drawing shows one example of a diagrammatic cross-section of an aircraft wing as FIG. 1.

DETAILED DESCRIPTION

Figure 1:
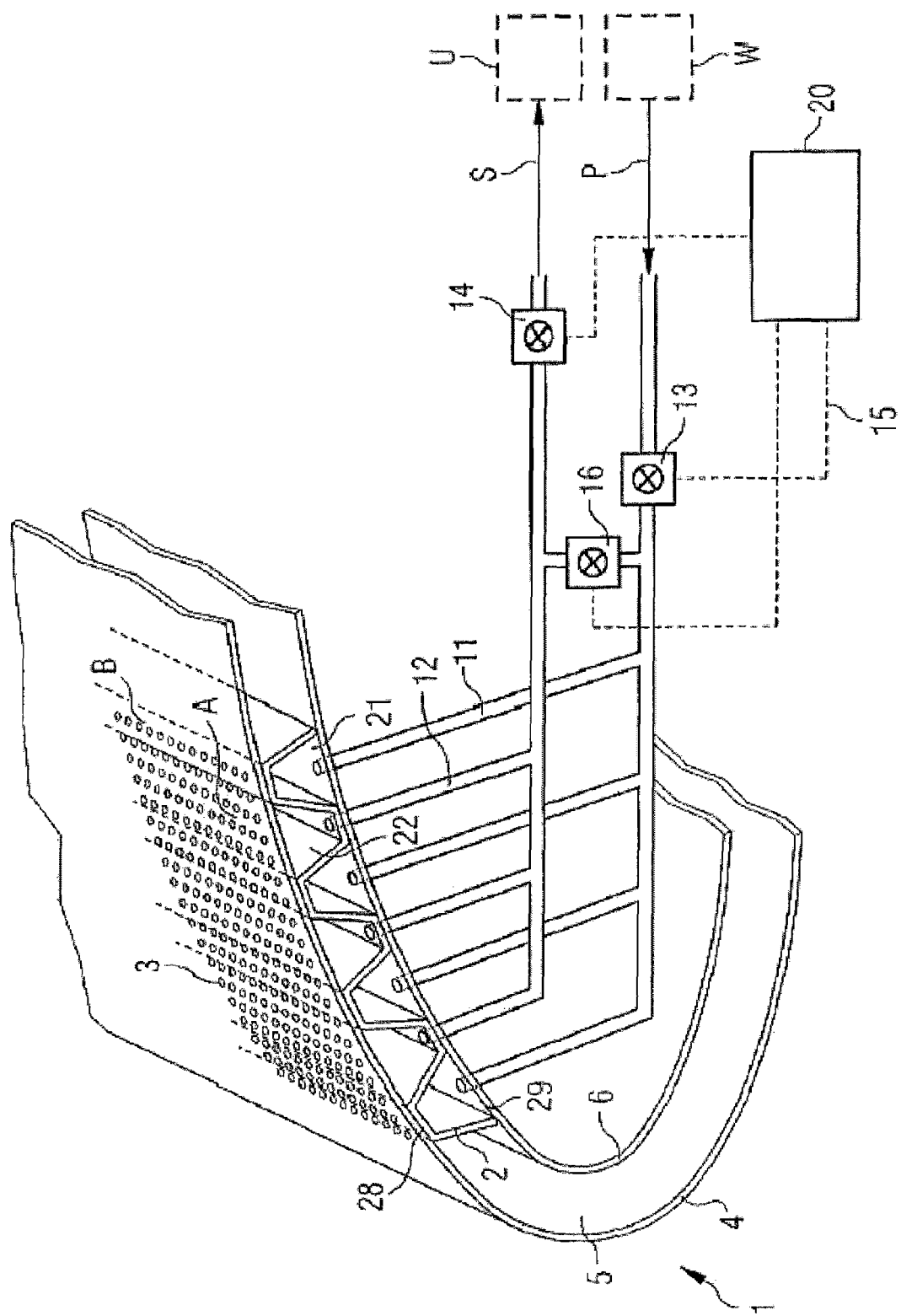

The examples described and drawings rendered are illustrative and are not to be read as limiting the scope of the invention as it is defined by the appended claims.

Only the air flow region of the wing 1 is shown. The wing skin is double-walled, comprising an outer wall element 4 and an inner wall element 6. On its pressure side, the outer wall element 4 comprises microperforations 3. While this is not shown in the FIGURE, the microperforations 3 extend across the entire width of the wing. A sheet 2 with trapezoidal corrugations has been inserted into the space 5 between the outer wall element 4 and the inner wall element 6. The open side 29 of the trapezoidal contour of the sheet 2 with trapezoidal corrugations is several times longer than the closed baseline 28. The closed baseline 28 of the sheet 2 with trapezoidal corrugations rests against the inner surface of the outer wall element 4 and of the inner wall element 6. The regions of the sheet 2 with trapezoidal corrugations, which regions rest against the inside of the outer wall element 4, comprise openings which communicate with the microperforations 3 in the outer wall element 4.

In this way, the sheet 2 with trapezoidal corrugations or its partition walls forms adjacent channels which taper off towards the outer wall element, which channels, due to the openings in the baseline of the sheet with trapezoidal corrugations, communicate with the microperforations, and alternately forms channels which extend towards the outside, with the outer walls of the latter channels being directly formed by the outer wall wall element 4. These latter channels are suction channels designated 22 which are connected with the regions A of the microperforations of the outer wall element 4. The channels which taper off outward towards the wall element 4 are pressure channels 21 which communicate with region B of the microperforations by way of the openings in the sheet 2 with trapezoidal corrugations.

Through suction lines 12, the suction channels 22 are combined and connected to a vacuum reservoir U by way of a suitable suction pipe system S. The suction pipe system comprises a check valve 14. Through corresponding pressure lines 11, the pressure channels 21 are combined and connected to a hot-air reservoir W by way of a pressure pipe system P. The pressure pipe system P comprises a controllable pressure valve 13 which can be activated by a control unit by way of the control line 15. Finally, the embodiment shown also provides for a short-circuit line between the suction pipe system S and the pressure pipe system P in that there is a controllable short-circuit valve 16 which can be activated by the control unit 20 by way of a control line 12.

In the stationary flight state, in which there is neither ice formation nor excessive quantities of water arising from the environment, the controllable valve 13 is closed, and the check valve 14 is open, and the short-circuit valve 16 is optionally open so that sucking-off of the boundary layer from the region A and if applicable also from the region B by way of the two suction channels 22 and 21 and the two suction lines 12 and 11, towards the vacuum reservoir U, takes place.

As soon as the danger of icing or of excessive quantities of water on the outside of the wing occurs, the controllable pressure valve 13 is opened and the check valve 14 is closed so that from the hot-air reservoir P, which can for example be supplied with bleed air from an aircraft engine, hot air is introduced, by way of the pressure pipe 11 and if applicable 12, to the pressure channels 21 and 22 from which it flows outward through the microperforations in the regions A and B. In this arrangement, the pressure valve 13 should be controllable such that not too large a quantity of pressurised air is introduced into the pressure channels 21 and 22 so as to prevent the boundary layer on the outside of the wing from being disturbed. Controlling the valves 13 and 14 can take place in an attuned way and can additionally be supported by the short-circuit valve 16.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Alternative combinations and variations of the examples provided will become apparent based on the disclosure. It is not possible to provide specific examples for all of the many possible combinations and variations of the embodiments described, but such combinations and variations may be claims that eventually issue.

LIST OF REFERENCE CHARACTERS

1 Wing
2 Partition wall (sheet with trapezoidal corrugations)
3 Microperforations
4 Outer wall element (of the wing)
5 Space
6 Inner wall element
11 Pressure line
12 Suction line
13 Controllable pressure valve
14 Check valve
15 Control line
16 Short-circuit valve
20 Control unit
21 Pressure channels
22 Suction channels
28 Baseline of the sheet with trapezoidal corrugations
29 Open side of the sheet with trapezoidal corrugations

The invention claimed is:

1. An aircraft component being exposed to streaming surrounding air, comprising
an inner wall;
an outer wall, the outer wall being displaced a distance from the inner wall, the distance defining a space between the inner wall and the outer wall;
a plurality of partition walls being inserted within the space between the inner wall and the outer wall, the plurality of partition walls are formed by an integral sheet with trapezoidal corrugations having a plurality of base areas, the base areas alternately in contact with the outer wall and the inner wall and having openings in fluid communication with a plurality of perforations through the outer wall such that a plurality of sections form a plurality of pressure channels, each adjacent to a respective one of a plurality of suction channels, the plurality of sections extending from the inner wall to the outer wall, such that:
the plurality of suction channels are adapted for sucking surrounding air from a plurality of first regions of the outer wall;
the plurality of pressure channels are adapted for feeding hot pressurized air to a plurality of second regions of the outer wall;
the plurality of first regions of the outer wall have a significantly larger area than the plurality of second regions of the outer wall; and
a control device controllably coupling the plurality of pressure channels to a hot air reservoir and the plurality of suction channels to a vacuum reservoir.

2. The aircraft component of claim 1, wherein open sides of the trapezoidal corrugations have longer areas than closed side of the trapezoidal corrugations.

3. The aircraft component of claim 1, further comprising a first controllable valve coupling the pressure channels to the hot air reservoir and a second control valve coupling the suction channels to the vacuum reservoir, such that a negative pressure in the suction channels is controllable by the control device.

4. The aircraft component of claim 3, wherein one of the first valve or the second valve is a pressure valve and the other of the first valve or second valve is a check valve, such that the control device is capable of alternately coupling the plurality of pressure channels to the hot air reservoir and the plurality of suction channels to the vacuum reservoir.

5. The aircraft component of claim 4, further comprising a third controllable valve coupling a pressure line in fluid communication with the plurality of pressure channels, with a suction line in fluid communication with the plurality of suction channels, such that the third controllable valve operates as a short circuit valve and the control device is capable of coupling the plurality pressure channels to the vacuum reservoir and the plurality of suction channels to the hot air reservoir.

6. The aircraft component of claim 5, wherein the first valve and the second valve are attuned by the control device operably controlling the third controllable valve.

* * * * *